(12) United States Patent
Nishikawa

(10) Patent No.: US 11,244,216 B2
(45) Date of Patent: Feb. 8, 2022

(54) IMAGE FORMING APPARATUS

(71) Applicant: KYOCERA Document Solutions Inc., Osaka (JP)

(72) Inventor: Shingo Nishikawa, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/939,690

(22) Filed: Jul. 27, 2020

(65) Prior Publication Data

US 2021/0034931 A1 Feb. 4, 2021

(30) Foreign Application Priority Data

Jul. 30, 2019 (JP) .............................. JP2019-139931

(51) Int. Cl.
*G06K 15/00* (2006.01)
*G06K 15/16* (2006.01)
*G06K 15/12* (2006.01)

(52) U.S. Cl.
CPC ........... *G06K 15/408* (2013.01); *G06K 15/12* (2013.01); *G06K 15/16* (2013.01)

(58) Field of Classification Search
CPC ....... G06K 15/408; G06K 15/16; G06K 15/12
See application file for complete search history.

(56) References Cited

U.S. PATENT DOCUMENTS

| 2001/0053294 A1 | 12/2001 | Yamada et al. | 399/66 |
| 2008/0292334 A1* | 11/2008 | Takahashi | B65H 7/04 399/38 |
| 2014/0240778 A1* | 8/2014 | Itogawa | G06F 1/1626 358/1.15 |

FOREIGN PATENT DOCUMENTS

| JP | 2001-356556 A | | 12/2001 |
| JP | 2003337450 A | * | 11/2003 |

* cited by examiner

*Primary Examiner* — Huo Long Chen
(74) *Attorney, Agent, or Firm* — Stein IP, LLC

(57) ABSTRACT

An image forming apparatus includes a plurality of paper feed portions, an image forming portion, a storage portion that stores, for each of the paper feed portions, sheet delay information indicating an occurrence frequency of a sheet delay that is a phenomenon in which a time required for arrival of a front end of the sheet at a prescribed position from the start of feeding of the sheet is larger than a threshold time, and a control portion that, based on the sheet delay information on the each of the paper feed portions, recognizes the occurrence frequency of a sheet delay of each of the plurality of paper feed portions and preferentially sets, as a paper feed source, one of the paper feed portions whose value of the occurrence frequency of a sheet delay is equal to or less than a prescribed value.

7 Claims, 10 Drawing Sheets

FIG.5

| PAPER FEED PORTION | WEIGHT ATTRIBUTE | SHEET DELAY INFORMATION (OCCURRENCE FREQUENCY) | |
|---|---|---|---|
| PAPER FEED PORTION (411) | FIRST ATTRIBUTE (LIGHTWEIGHT) | NONE | ← A11 |
| | SECOND ATTRIBUTE (NORMAL-WEIGHT) | NONE | ← A12 |
| | THIRD ATTRIBUTE (HEAVYWEIGHT) | NONE | ← A13 |
| PAPER FEED PORTION (412) | FIRST ATTRIBUTE (LIGHTWEIGHT) | 5% | ← A21 |
| | SECOND ATTRIBUTE (NORMAL-WEIGHT) | 10% | ← A22 |
| | THIRD ATTRIBUTE (HEAVYWEIGHT) | 30% | ← A23 |
| PAPER FEED PORTION (413) | FIRST ATTRIBUTE (LIGHTWEIGHT) | NONE | ← A31 |
| | SECOND ATTRIBUTE (NORMAL-WEIGHT) | NONE | ← A32 |
| | THIRD ATTRIBUTE (HEAVYWEIGHT) | NONE | ← A33 |
| PAPER FEED PORTION (414) | FIRST ATTRIBUTE (LIGHTWEIGHT) | NONE | ← A41 |
| | SECOND ATTRIBUTE (NORMAL-WEIGHT) | 5% | ← A42 |
| | THIRD ATTRIBUTE (HEAVYWEIGHT) | 10% | ← A43 |

FIG.7

| PAPER FEED PORTION | WEIGHT ATTRIBUTE | TIME REQUIRED FOR ARRIVAL (AVERAGE TIME) | THEORETICAL TIME | DIFFERENTIAL TIME INFORMATION (DIFFERENTIAL TIME) | |
|---|---|---|---|---|---|
| PAPER FEED PORTION (411) | FIRST ATTRIBUTE (LIGHTWEIGHT) | 1020ms | 1000ms | 20ms | ←B11 |
| | SECOND ATTRIBUTE (NORMAL-WEIGHT) | 1020ms | 1000ms | 20ms | ←B12 |
| | THIRD ATTRIBUTE (HEAVYWEIGHT) | 1020ms | 1000ms | 20ms | ←B13 |
| PAPER FEED PORTION (412) | FIRST ATTRIBUTE (LIGHTWEIGHT) | 1020ms | 1000ms | 20ms | ←B21 |
| | SECOND ATTRIBUTE (NORMAL-WEIGHT) | 1200ms | 1000ms | 200ms | ←B22 |
| | THIRD ATTRIBUTE (HEAVYWEIGHT) | 1400ms | 1000ms | 400ms | ←B23 |
| PAPER FEED PORTION (413) | FIRST ATTRIBUTE (LIGHTWEIGHT) | 1020ms | 1000ms | 20ms | ←B31 |
| | SECOND ATTRIBUTE (NORMAL-WEIGHT) | 1020ms | 1000ms | 20ms | ←B32 |
| | THIRD ATTRIBUTE (HEAVYWEIGHT) | 1020ms | 1000ms | 20ms | ←B33 |
| PAPER FEED PORTION (414) | FIRST ATTRIBUTE (LIGHTWEIGHT) | 1020ms | 1000ms | 20ms | ←B41 |
| | SECOND ATTRIBUTE (NORMAL-WEIGHT) | 1100ms | 1000ms | 100ms | ←B42 |
| | THIRD ATTRIBUTE (HEAVYWEIGHT) | 1420ms | 1000ms | 420ms | ←B43 |

IMAGE FORMING APPARATUS

INCORPORATION BY REFERENCE

This application is based upon and claims the benefit of priority from the corresponding Japanese Patent Application No. 2019-139931 (filed on Jul. 30, 2019), the contents of which are incorporated herein by reference.

BACKGROUND

The present disclosure relates to an image forming apparatus that prints an image on a sheet being conveyed along a sheet conveyance path.

Conventionally, there is known an image forming apparatus that conveys a sheet along a sheet conveyance path and prints an image on the sheet while being conveyed.

Such a conventional image forming apparatus includes an intermediate transfer belt and a transfer roller that comes into pressure contact with the intermediate transfer belt. The conventional image forming apparatus transfers (primarily transfers) a toner image onto the intermediate transfer belt. Then, when a sheet being conveyed passes through a transfer nip, the toner image on the intermediate transfer belt is transferred (secondarily transferred) to the sheet.

The conventional image forming apparatus is provided with a paper feed roller for feeding a sheet to the sheet conveyance path. The paper feed roller rotates in a state of being in contact with a sheet housed in a cassette. Thus, the sheet is fed to the sheet conveyance path.

Here, there may occur a sheet delay that is a phenomenon in which the paper feed roller slips relative to a sheet, causing the sheet to be delayed in arriving at the transfer nip. This case might result in a trouble that even though no sheet has yet arrived at the transfer nip, a toner image on the intermediate transfer belt arrives at the transfer nip.

SUMMARY

An image forming apparatus according to one aspect of the present disclosure includes a plurality of paper feed portions, an image forming portion, a storage portion, and a control portion. Each of the plurality of paper feed portions includes a cassette housing a sheet therein and feeds the sheet housed in the cassette corresponding thereto to a sheet conveyance path. The image forming portion prints an image on the sheet fed to the sheet conveyance path. The storage portion stores, for each of the plurality of paper feed portions, sheet delay information indicating an occurrence frequency of a sheet delay that is a phenomenon in which a time required for arrival of a front end of the sheet at a prescribed position in the sheet conveyance path from the start of feeding of the sheet is larger than a preset threshold time. Based on the sheet delay information on the each of the plurality of paper feed portions stored in the storage portion, the control portion recognizes the occurrence frequency of the sheet delay of the each of the plurality of paper feed portions, preferentially sets, as a paper feed source, one of the plurality of paper feed portions whose value of the occurrence frequency of the sheet delay is equal to or less than a prescribed value, and controls the one of the plurality of paper feed portions set as the paper feed source to feed the sheet to the sheet conveyance path.

BRIEF DESCRIPTION OF THE DRAWINGS

FIG. 5 is a view for explaining the sheet delay information generated by the control portion of the image forming apparatus according to the one embodiment of the present disclosure.

FIG. 7 is a view for explaining the differential time information generated by the control portion of the image forming apparatus according to the one embodiment of the present disclosure.

DETAILED DESCRIPTION

<Configuration of Image Forming Apparatus>

Figure 1:
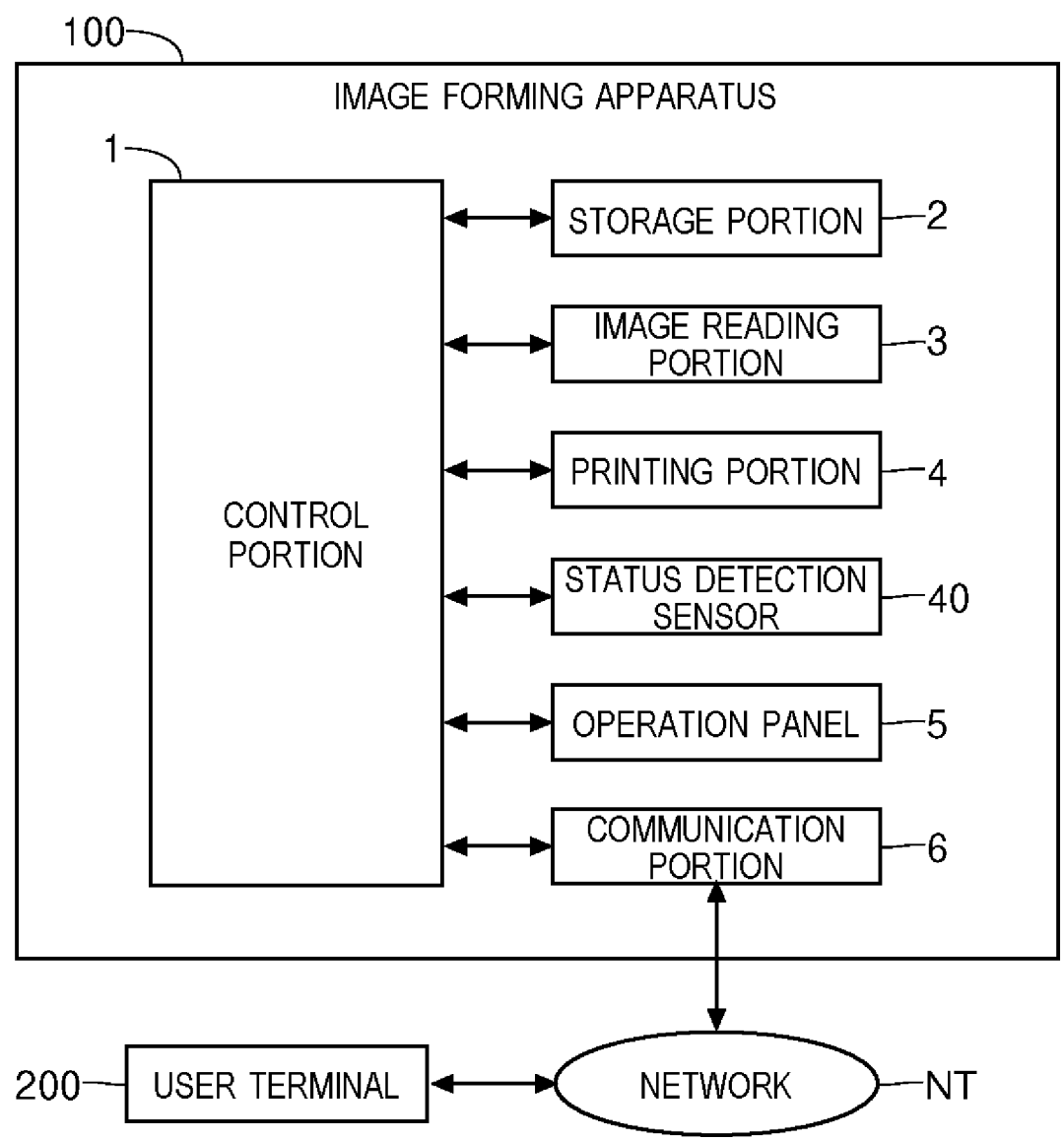
FIG. 1 is a block diagram showing a configuration of an image forming apparatus according to one embodiment of the present disclosure.

As shown in FIG. 1, an image forming apparatus 100 of this embodiment includes a control portion 1 and a storage portion 2. The control portion 1 includes a CPU. Based on a control program and control data, the control portion 1 controls the image forming apparatus 100. The storage portion 2 includes storage devices such as a ROM, a RAM, and an HDD. The storage portion 2 stores the control program and the control data. The storage portion 2 is connected to the control portion 1. The control portion 1 reads information from the storage portion 2 and writes information into the storage portion 2.

The image forming apparatus 100 further includes an image reading portion 3 and a printing portion 4. The control portion 1 controls a reading operation of the image reading portion 3. The control portion 1 also controls a printing operation of the printing portion 4.

The image reading portion 3 optically reads an original document. Image data obtained through reading of the original document by the image reading portion 3 is used in, for example, a printing job. The image reading portion 3 includes a light source and an image sensor. The light source irradiates the original document with light. The image sensor receives reflected light reflected off the original document and uses it to perform photoelectric conversion.

The printing portion 4 operates when a job to be executed is a printing job. At the time of executing the printing job, the printing portion 4 conveys a sheet S (see FIG. 2).

Furthermore, the printing portion 4 forms an image to be printed on the sheet S. Then, the printing portion 4 prints the image on the sheet S while being conveyed. For example, in a printing job (a copy job) involving reading of an original document by the image reading portion 3, an image based on image data obtained through the reading of the original document by the image reading portion 3 is printed on the sheet S by the printing portion 4.

Figure 2:
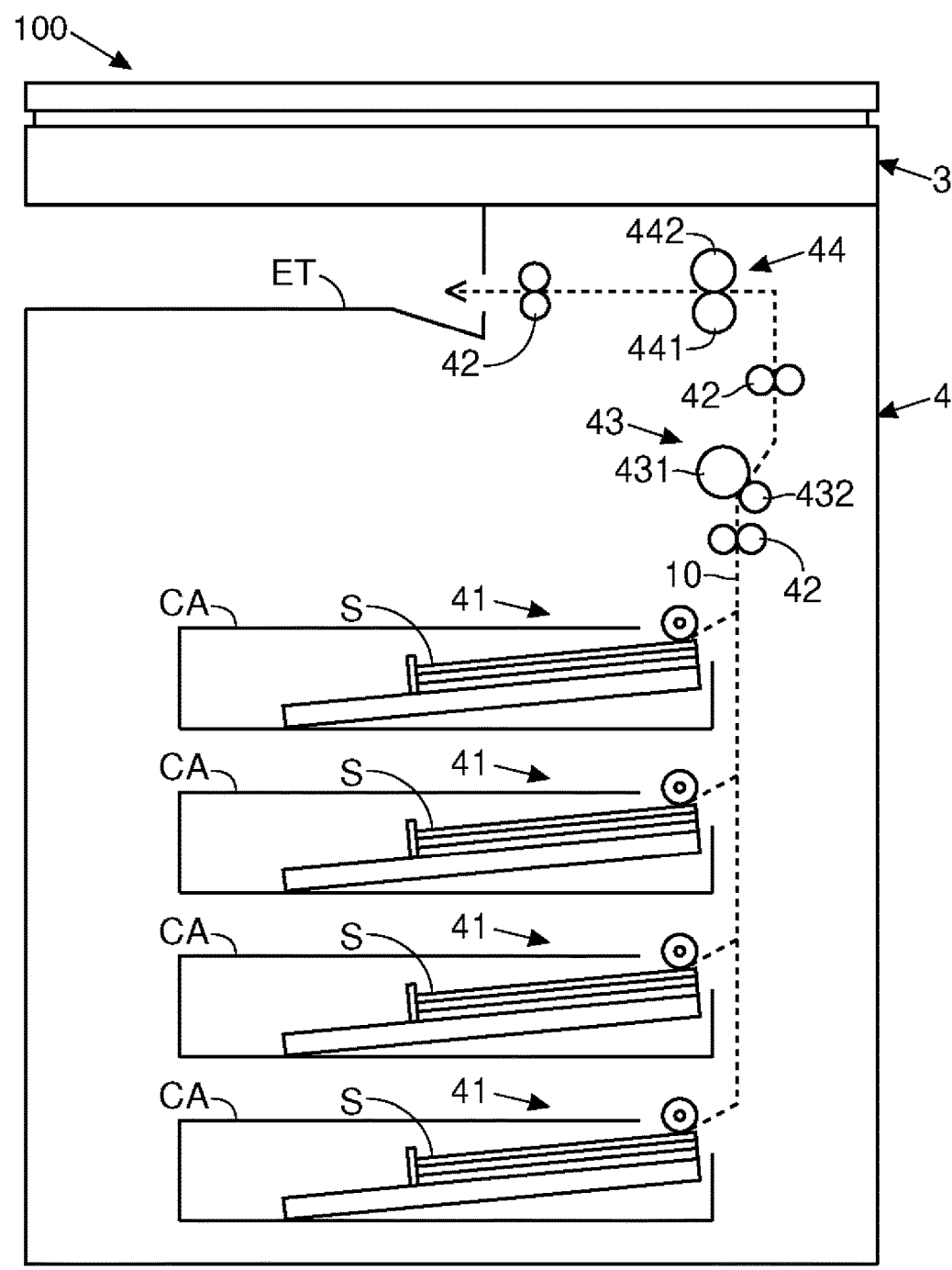
FIG. 2 is a schematic view showing the configuration of the image forming apparatus according to the one embodiment of the present disclosure.

As shown in FIG. 2, the printing portion 4 includes a paper feed portion 41. The paper feed portion 41 feeds the sheet S to a sheet conveyance path 10 (indicated by a broken line arrow).

Figure 3:
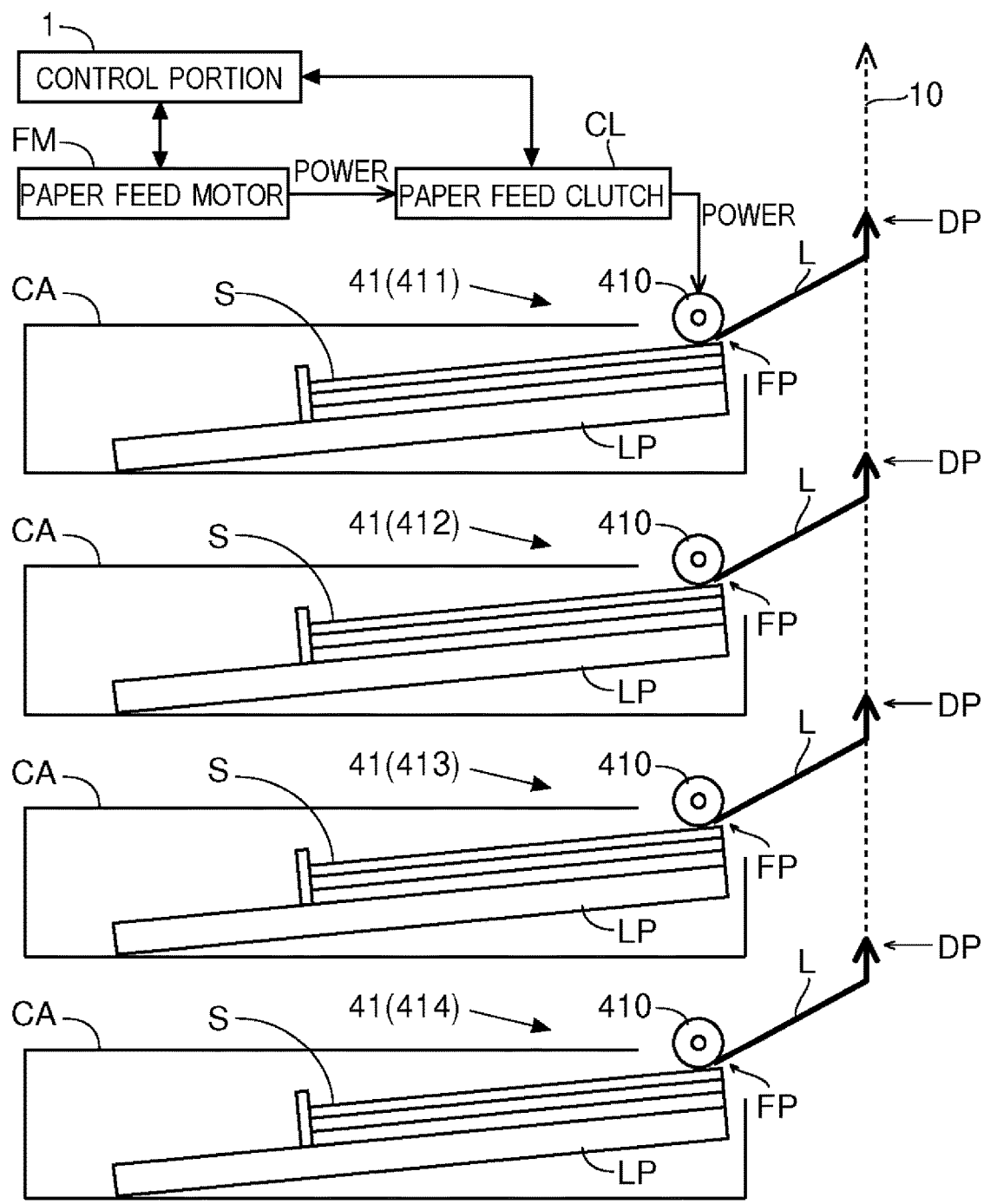
FIG. 3 is a schematic view showing a configuration of a paper feed portion of the image forming apparatus according to the one embodiment of the present disclosure.

As shown in FIG. 3, the paper feed portion 41 includes a rotor 410. The rotor 410 is a roller. The number of rotors 410 installed is not particularly limited. For example, the rotor 410 shown in FIG. 3 is referred to as a paper feed roller or a pick-up roller.

Furthermore, the paper feed portion 41 includes a cassette CA. The sheet S is housed in the cassette CA. The cassette CA is mountable in and demountable from the image forming apparatus 100. The sheet S in the cassette CA is placed on a lift plate LP.

The sheet S is housed in the cassette CA by a user. When performing such a housing operation, after pulling out the cassette CA from the image forming apparatus 100, the user houses the sheet S in the cassette CA and mounts the cassette CA in the image forming apparatus 100.

The rotor 410 rotates in a state of being in contact with the sheet S. With the rotor 410 rotating in the state of being in contact with the sheet S, the sheet S in the cassette CA is drawn out and fed to the sheet conveyance path 10. The rotor 410 is disposed above the sheet S in the cassette CA. At the time of feeding the sheet S to the sheet conveyance path 10, the rotor 410 comes into contact from above with the sheet S in the cassette CA and rotates in that state.

As the sheet S is fed to the sheet conveyance path 10 and thus the number of sheets S in the cassette CA decreases, the lift plate LP ascends. Accordingly, even when the number of sheets S in the cassette CA decreases, the rotor 410 is maintained in the state of being in contact with the sheet S in the cassette CA.

Though not shown, the paper feed portion 41 may include a separation roller pair installed on a downstream side of the rotor 410 in a sheet conveyance direction. The separation roller pair separates a batch of sheets S drawn out from the cassette CA by the rotor 410 into individual sheets S.

Furthermore, the paper feed portion 41 includes a paper feed motor FM. Power of the paper feed motor FM is transmitted to the rotor 410. The rotor 410 receives power from the paper feed motor FM and uses it to rotate. The paper feed motor FM is joined to the rotor 410 via a paper feed clutch CL. When the paper feed clutch CL is turned on, power is transmitted from the paper feed motor FM to the rotor 410. When the paper feed clutch CL is turned off, the rotor 410 is brought into a free state.

A plurality of paper feed portions 41 are installed in the image forming apparatus 100. That is, a plurality of cassettes CA are mounted in the image forming apparatus 100. The plurality of cassettes CA are provided so as to be stacked in an up-down direction of the image forming apparatus 100. The rotor 410 of each of the plurality of paper feed portions 41 is installed at a position FP where the rotor 401 is contactable with the sheet S in a corresponding one of the cassettes CA. A plurality of such positions FP each constitute a paper feed position. Each of the plurality of paper feed portions 41 feeds the sheet S from a corresponding one of the paper feed positions FP to the sheet conveyance path 10.

The number of paper feed portions 41 installed is not particularly limited. While the following describes a case where four paper feed portions 41 are installed in the image forming apparatus 100, the number of paper feed portions 41 installed may be two or five or more.

In the following description, among the paper feed portions 41, an uppermost one may be denoted by reference numeral 411, a second one from the top by reference numeral 412, a third one from the top by reference numeral 413, and a lowermost one by reference numeral 414.

As a modification example, a configuration may be adopted in which the number of paper feed motors FM installed is one, and one paper feed motor FM is connected to the paper feed clutch CL of each of the plurality of paper feed portions 41. Even in a case where one paper feed motor FM is shared among the plurality of paper feed portions 41, by maintaining, in an off state, the paper feed clutch CL of each of those ones of the paper feed portions 41 which are not used in a printing job, only the sheet S housed in that one of the paper feed portions 41 which is used in the printing job can be fed to the sheet conveyance path 10.

The paper feed motor FM and the paper feed clutch CL are connected to the control portion 1. The control portion 1 controls the paper feed motor FM. The control portion 1 also controls the paper feed clutch CL. By controlling the paper feed motor FM and the paper feed clutch CL, the control portion 1 controls the rotor 410 to rotate properly. That is, the control portion 1 controls the rotor 410 to perform a rotary operation and to stop the rotary operation.

Referring back to FIG. 2, the sheet S fed to the sheet conveyance path 10 is conveyed along the sheet conveyance path 10. In order for the sheet S to be conveyed along the sheet conveyance path 10, a conveyance roller pair 42 is provided in the sheet conveyance path 10. The number of conveyance roller pairs 42 installed is not particularly limited. The number of conveyance roller pairs 42 installed can be changed depending on, for example, a length of a conveyance route of the sheet S. An installation position of the conveyance roller pair 42 can also be changed depending on, for example, the length of the conveyance route of the sheet S.

The printing portion 4 includes an image forming portion 43. The image forming portion 43 forms an image (a toner image) to be printed on the sheet S and prints (transfers) the thus formed image on the sheet S. The image forming portion 43 includes a photosensitive drum 431 and a transfer roller 432. The photosensitive drum 431 carries a toner image on a circumferential surface thereof. The transfer roller 432 comes into pressure contact with the photosensitive drum 431 so as to form a transfer nip between itself and the photosensitive drum 431. The sheet S being conveyed passes through the transfer nip. When the sheet S passes through the transfer nip, the toner image on the circumferential surface of the photosensitive drum 431 is transferred on the sheet S.

Though not shown, the image forming portion 43 includes a charging device, an exposure device, and a developing device. The charging device charges the circumferential surface of the photosensitive drum 431. The exposure device forms an electrostatic latent image on the circumferential surface of the photosensitive drum 431. The developing device develops the electrostatic latent image formed on the circumferential surface of the photosensitive drum 431 into a toner image.

The printing portion 4 includes a fixing portion 44. The fixing portion 44 fixes the toner image on the sheet S. The fixing portion 44 includes a heating roller 441 and a pressing roller 442. The heating roller 441 includes a built-in heater (not shown). The pressing roller 442 comes into pressure contact with the heating roller 441 so as to form a fixing nip between itself and the heating roller 441. The sheet S on which the toner image has been transferred passes through the fixing nip. At this time, the sheet S is heated and pressed, and thus the toner image is fixed on the sheet S. The sheet S that has passed through the fixing nip is discharged on a discharge tray ET.

Furthermore, as shown in FIG. 1, the image forming apparatus 100 includes an operation panel 5. The operation panel 5 includes a touch screen and a hardware button. The touch screen displays a screen on which software buttons are provided and accepts a touch operation from a user. A plurality of hardware buttons are provided on the operation panel 5. The hardware buttons include, for example, a start button for accepting a request for executing a copy job from a user.

When accepting the request for executing a copy job, the operation panel 5 accepts, from a user, designation of that one of the paper feed portions 41 which is to be used in the copy job. In other words, the operation panel 5 accepts, from the user, designation of a type of sheet S to be used in the copy job. Upon the operation panel 5 accepting the request for executing the copy job (upon the start button being operated), the control portion 1 controls the image reading portion 3 to read an original document. Then, the control portion 1 controls the printing portion 4 to print, on the sheet S, an image based on image data obtained through reading of the original document by the image reading portion 3.

Here, there are plural types of weight attributes for each type of sheet S usable in a printing job (each type of sheet S feedable to the sheet conveyance path 10). Some users may house, in one of the paper feed portions 41, a type of sheet S having a different type of weight attribute from that of a type of sheet S housed in another one of the paper feed portions 41.

From this viewpoint, the operation panel 5 accepts, from a user, an input of a type of weight attribute of a type of sheet S currently housed in each of the plurality of paper feed portions 41. When the user has housed a type of sheet S, the user inputs, to the operation panel 5, a type of weight attribute of the type of sheet S thus housed. The storage portion 2 stores weight attribute information indicating a type of weight attribute of each of types of sheets S housed in the plurality of paper feed portions 41, respectively. Based on the weight attribute information, the control portion 1 recognizes the type of weight attribute of the each of types of sheets S housed in the plurality of paper feed portions 41, respectively. For example, there are three types of weight attributes that are a first attribute (lightweight), a second attribute (normal-weight), and a third attribute (heavyweight).

Furthermore, the image forming apparatus 100 includes a communication portion 6. The communication portion 6 includes a communication circuit, a communication memory, a communication connector, and so on. The communication portion 6 is connected to a network NT such as a LAN.

Using the communication portion 6, the control portion 1 communicates with a user terminal 200 connected to the network NT. The user terminal 200 is used by a user of the image forming apparatus 100. The user terminal 200 is, for example, a personal computer.

For example, job data including PDL (page description language) data or the like is transmitted from the user terminal 200 to the image forming apparatus 100. The job data includes information indicating a user-designated one of the paper feed portions 41 (a user-designated type of sheet S). Upon the communication portion 6 receiving the job data, the control portion 1 determines that a request for executing a printing job has been accepted from a user. Upon the communication portion 6 receiving the job data, based on the job data, the control portion 1 generates image data and controls the printing portion 4 to print, on the sheet S, an image based on the image data thus generated.

Upon executing the printing job, the control portion 1 controls the storage portion 2 to store a piece of job history information corresponding to the printing job thus executed. The job history information includes various types of information related to a printing job such as a date of executing the corresponding printing job, the number of sheets printed in the corresponding printing job, a type (a weight attribute, a size attribute, or the like) of the sheet S used in the corresponding printing job, and an identifier of that one of the paper feed portions 41 which was used in the corresponding printing job.

Here, the control portion 1 performs a feed-conveyance status determination process of determining a feed-conveyance status of the sheet S in the sheet conveyance path 10 (a status of feeding the sheet S to the sheet conveyance path 10 and a status of conveying the sheet S fed to the sheet conveyance path 10). In order for the control portion 1 to perform the feed-conveyance status determination process, a status detection sensor 40 (corresponding to a "sensor") is installed in the image forming apparatus 100. The status detection sensor 40 is connected to the control portion 1.

The status detection sensor 40 performs detection at a position DP shown in FIG. 3 (a prescribed position in the sheet conveyance path 10) as a detection position. The status detection sensor 40 detects, at the detection position DP, arrival of a front end of the sheet S in the conveyance direction thereof. The status detection sensor 40 also detects, at the detection position DP, passing of a rear end of the sheet S in the conveyance direction thereof.

The status detection sensor 40 is a transmissive optical sensor having a light emitting portion and a light receiving portion. The status detection sensor 40 performs detection with respect to an actuator (not shown). The actuator protrudes inward of the sheet conveyance path 10. Furthermore, the actuator is pivotably supported. When the front end of the sheet S arrives at the detection position DP, the actuator is pushed by the sheet S to pivot toward one side, thus blocking or opening an optical path (a detection region) between the light emitting portion and the light receiving portion. On the other hand, when the rear end of the sheet S passes through the detection position DP, the actuator pivots toward the other side opposite to the one side to return to an original position, thus opening or blocking the optical path (the detection region) between the light emitting portion and the light receiving portion.

With this configuration, when the sheet S is absent at the detection position DP, a signal at a first level (one of an H level and an L level) is outputted from the status detection sensor 40. When the sheet S is present at the detection position DP, a signal at a second level (the other of the H level and the L level) is outputted from the status detection sensor 40. When the front end of the sheet S arrives at the detection position DP, an output value of the status detection sensor 40 changes in level from the first level to the second level. When the rear end of the sheet S passes through the detection position DP, an output value of the status detection sensor 40 changes in level from the second level to the first level.

Based on an output value of the status detection sensor 40, the control portion 1 determines the feed-conveyance status of the sheet S in the sheet conveyance path 10. When an output value of the status detection sensor 40 has changed in level from the first level to the second level, the control portion 1 determines that the status detection sensor 40 has detected arrival of the front end of the sheet P (the front end of the sheet S has arrived at the detection position DP).

Though not shown, in the sheet conveyance path 10, in addition to the status detection sensor 40, there are installed a plurality of sensors each having an output value that changes depending on the presence or absence of the sheet S at a detection position corresponding thereto. Among detection positions of the plurality of sensors including the status detection sensor 40, a detection position at which the front end of the sheet S fed to the sheet conveyance path 10 arrives first is set as the detection position DP of the status detection sensor 40.

In a case where the plurality of paper feed portions 41 are installed in the image forming apparatus 100, there are installed, in the image forming apparatus 100, the same number of status detection sensors 40 as the number of paper feed portions 41 installed. The plurality of status detection sensors 40 are assigned respectively to the paper feed portions 41 different from each other.

Each of the plurality of status detection sensors 40 has the detection position DP at a prescribed distance from the paper feed position FP of a corresponding one of the paper feed portions 41 along the conveyance route of the sheet S. For example, a conveyance path L (indicated by a bold line arrow in FIG. 3) of the sheet S extending from each of all the paper feed positions FP to a corresponding one of the detection positions DP has an equal length.

<Time Measuring Process>

Upon accepting a request for executing a printing job, the control portion 1 performs a paper feed source setting process of setting any one of the plurality of paper feed portions 41 as a paper feed source. Then, the control portion 1 starts the printing job. At this time, the control portion 1 controls the any one of the paper feed portions 41 thus set as the paper feed source to feed the sheet S to the sheet conveyance path 10. That is, in a printing job, there is used a type of sheet S housed in one of the paper feed portions 41 set as the paper feed source. The paper feed source setting process will be described later in detail.

At or after the start of the printing job, every time the one of the paper feed portions 41 set as the paper feed source feeds one sheet S, the control portion 1 performs a time measuring process. The following specifically describes the time measuring process. In the following description, for the sake of convenience, the rotor 410 of the one of the paper feed portions 41 set as the paper feed source is referred to as a paper feed source rotor 410 for distinction from the rotor 410 of each of the other paper feed portions 41. Furthermore, the status detection sensor 40 corresponding to the one of the paper feed portions 41 set as the paper feed source is referred to as a paper feed source sensor 40 for distinction from the status detection sensor 40 corresponding to each of the other paper feed portions 41.

The control portion 1 performs, as the time measuring process, a process of measuring a time required for arrival of the front end of the sheet S (a type of sheet S fed this time) in the conveyance direction thereof at the detection position DP of the paper feed source sensor 40 from the start of feeding of the sheet S by one of the paper feed portions 41 set as the paper feed source. The time measuring process is performed with respect to all the sheets S fed in a printing job by the one of the paper feed portions 41 set as the paper feed source. When "n" sheets are printed in the printing job, the time measuring process is performed "n" times.

Here, the paper feed source rotor 410 starts rotating, and thus the one of the paper feed portions 41 set as the paper feed source starts feeding of the sheet S. When measuring the time required for arrival, the control portion 1 starts time measuring from the start of rotation of the paper feed source rotor 410. For example, in a case where the paper feed source rotor 410 is slipping relative to the sheet S, the time required for arrival is increased compared with a case where no such slipping is occurring.

The control portion 1 turns off the paper feed clutch CL of the one of the paper feed portions 41 set as the paper feed source at or after the start of feeding of the sheet S by the one of the paper feed portions 41 set as the paper feed source and before the rear end of the sheet S in the conveyance direction thereof completely passes through the paper feed position FP corresponding to the one of the paper feed portions 41 set as the paper feed source, thus controlling the paper feed source rotor 410 to stop rotating (bringing the paper feed source rotor 410 into the free state). When controlling the one of the paper feed portions 41 set as the paper feed source to feed a subsequent sheet S, the control portion 1 turns on the paper feed clutch CL of the one of the paper feed portions 41 set as the paper feed source, thus controlling the paper feed source rotor 410 to rotate. Further, at this time, the control portion 1 restarts time measuring.

The control portion 1 performs control so that, for each of the paper feed portions 41, a value of the time required for arrival measured in the time measuring process is stored in the storage portion 2. For example, every time the control portion 1 performs the time measuring process, the control portion 1 performs control so that a value of the time required for arrival measured in the time measuring process performed this time is stored in the storage portion 2 so as to be associated with an identifier of the one of the paper feed portions 41 set as the paper feed source.

Moreover, the control portion 1 recognizes a type of weight attribute of the type of sheet S with respect to which the value of the time required for arrival has been measured in the time measuring process performed this time and associates the thus recognized type of weight attribute with the value of the time required for arrival. That is, in the storage portion 2, sheet delay information on each of the plurality of paper feed portions 41 is stored with respect to each type of weight attribute. Furthermore, the control portion 1 recognizes a measurement date and time of the time measuring process performed this time (or a date and time of execution of the printing job) and associates the thus recognized measurement date and time with the value of the time required for arrival.

<Information Updating Process>

The sheet delay information on each of the plurality of paper feed portions 41 is stored in the storage portion 2. The sheet delay information indicates an occurrence frequency of a sheet delay that is a phenomenon in which the time required for arrival of the front end of the sheet S in the conveyance direction thereof (the time required for arrival) at the detection position DP of the status detection sensor 40 (the prescribed position in the sheet conveyance path 10) from the start of feeding of the sheet S by any of the paper feed portions 41 is larger than a preset threshold time. The threshold time is set to a value obtained by adding a preset margin time to a theoretical time required for arrival of the front end of the sheet S in the conveyance direction thereof at the detection position DP of the status detection sensor 40 from the start of feeding of the sheet S by any of the paper feed portions 41. The threshold time and the theoretical time are previously stored in the storage portion 2.

Upon determining that a preset updating condition (corresponding to a "prescribed condition") is met, the control portion 1 performs an information updating process of updating the sheet delay information on each of the plurality of paper feed portions 41. Timing to perform the information updating process is not particularly limited.

For example, when the image forming apparatus 100 is delivered, a delivery date and time of the image forming apparatus 100 is inputted to the operation panel 5. The delivery date and time of the image forming apparatus 100 is stored in the storage portion 2. Further, at every lapse of a prescribed number of days (for example, one to several months) from the delivery of the image forming apparatus 100 onward, the control portion 1 determines that the updating condition is met and thus performs the information updating process.

Furthermore, the operation panel 5 accepts a request for executing the information updating process from a user. Upon the operation panel 5 receiving the request for executing the information updating process, the control portion 1 determines that the updating condition is met and thus performs information updating process.

A configuration may be adopted in which every time a printing job is executed, the control portion 1 performs the information updating process. In this configuration, the control portion 1 performs the information updating process and then performs the paper feed source setting process.

Figure 4:
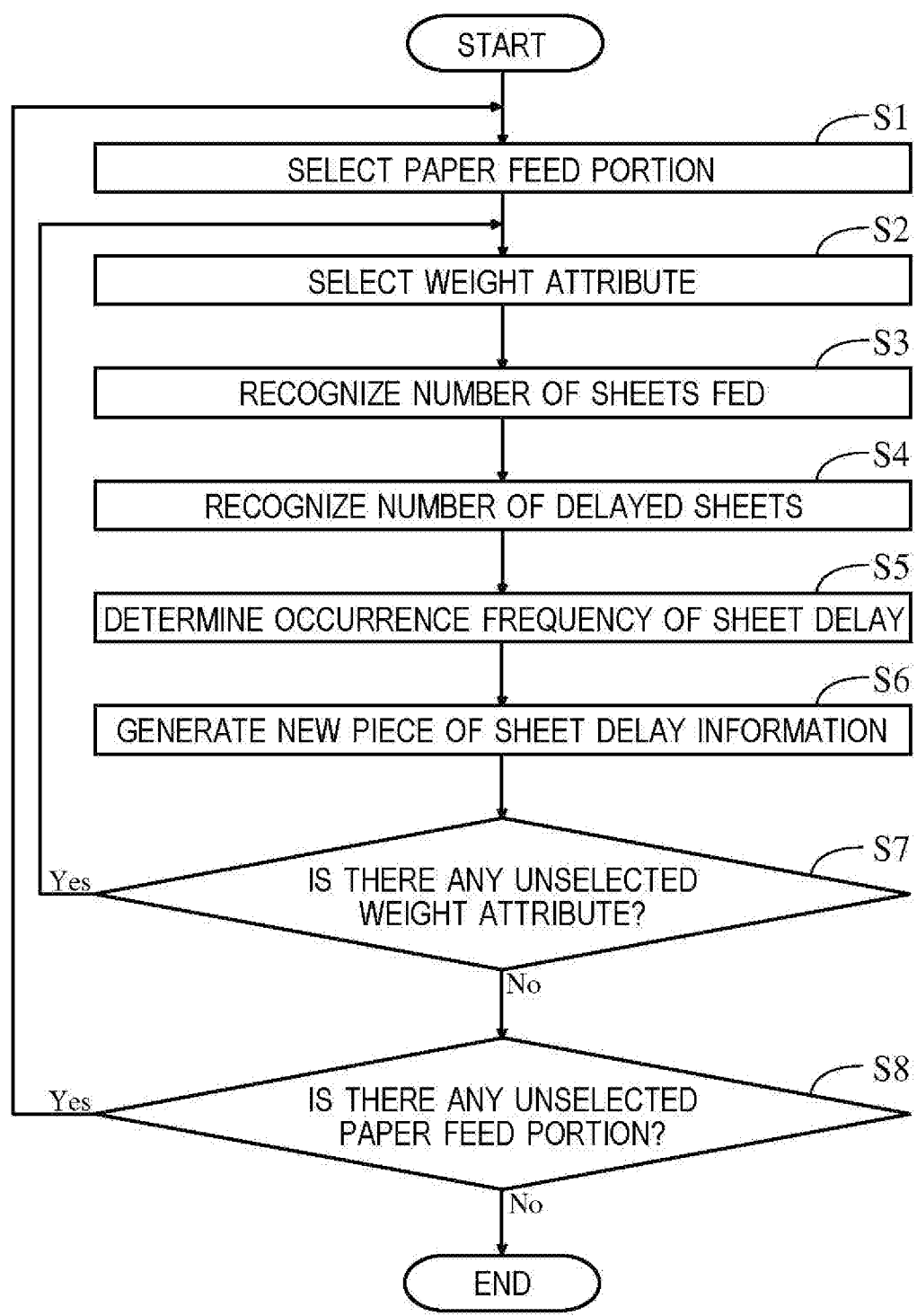
FIG. 4 is a flow chart showing a flow of an information updating process (a process of updating sheet delay information) performed by a control portion of the image forming apparatus according to the one embodiment of the present disclosure.

With reference to a flow chart shown in FIG. 4, the following describes a flow of the information updating process (a process of updating the sheet delay information) performed by the control portion 1. The flow shown in FIG. 4 starts when the control portion 1 determines that the updating condition is met.

At Step S1, the control portion 1 selects one of the plurality of paper feed portions 41 (the paper feed portions 411 to 414). In the following description, one of the paper feed portions 41 selected by the control portion 1 in a process of Step S1 is referred to as a selected paper feed portion 41.

At Step S2, the control portion 1 selects one of the plural types of weight attributes (the first to third attributes). In the following description, one type of weight attribute selected by the control portion 1 in a process of Step S2 is referred to as a selected weight attribute.

At Step S3, the control portion 1 recognizes the number of sheets S each having the selected weight attribute, which have been fed by the selected paper feed portion 41 within a prescribed latest period of time. Here, among values of the time required for arrival measured within the prescribed latest period of time, the number of stored values of the time required for arrival associated with an identifier of the selected paper feed portion 41 and associated with the selected weight attribute may be recognized as the number of sheets S fed. Furthermore, the number of sheets S fed may be recognized based on the job history information.

The prescribed period of time is set to, for example, one month. The prescribed period of time can be changed arbitrarily by a user. The operation panel 5 accepts such a change to the prescribed period of time from the user.

At Step S4, the control portion 1 recognizes the number of delayed sheets that is the number of sheets S each having a value of the time required for arrival larger than the preset threshold time among the sheets S each having the selected weight attribute, which have been fed by the selected paper feed portion 41 within the prescribed latest period of time (for example, one month). Here, among values of the time required for arrival measured within the prescribed latest period of time, which are associated with the identifier of the selected paper feed portion 41 and associated with the selected weight attribute, the number of stored values of the time required for arrival larger than the threshold time may be recognized as the number of delated sheets.

At Step S5, the control portion 1 determines, as the occurrence frequency of a sheet delay, a ratio of the number of delayed sheets to the number of sheets fed. Further, at Step S6, the control portion 1 newly generates, as a piece of sheet delay information corresponding to the selected paper feed portion 41 and corresponding to the selected weight attribute, a piece of information indicating the occurrence frequency of a sheet delay (the ratio of the number of delayed sheets to the number of sheets fed) determined in a process of Step S5.

Furthermore, the control portion 1 controls the storage portion 2 to store the new piece of sheet delay information thus generated. At this time, the control portion 1 deletes, from the storage portion 2, any existing piece of sheet delay information corresponding to the selected paper feed portion 41 and corresponding to the selected weight attribute. That is, the control portion 1 rewrites any existing piece of sheet delay information stored in the storage portion 2 into a new piece of sheet delay information.

At a point in time of the delivery of the image forming apparatus 100, the occurrence frequency of a sheet delay indicated by the sheet delay information on each of the plurality of paper feed portions 41 is set to zero.

At Step S7, the control portion 1 determines whether or not there is any unupdated piece of sheet delay information among weight attribute-specific pieces of sheet delay information on the selected paper feed portion 41. In other words, the control portion 1 determines whether or not there is any unselected weight attribute. In a case where the control portion 1 determines that there is any unselected weight attribute (there remains any unupdated piece of sheet delay information among the weight attribute-specific pieces of sheet delay information on the selected paper feed portion 41), a transition is made to Step S2. On the other hand, in a case where the control portion 1 determines that there is no unselected weight attribute (all of the weight attribute-specific pieces of sheet delay information on the selected paper feed portion 41 have been updated), a transition is made to Step S8.

Upon the transition from Step S7 to Step S2, the control portion 1 extracts one unupdated piece of sheet delay information among the weight attribute-specific pieces of sheet delay information on the selected paper feed portion 41 and selects a type of weight attribute corresponding to the extracted piece of sheet delay information (said type of weight attribute is used as a new selected weight attribute). After that, the control portion 1 performs processes of Steps S3 to S6.

In a case where the transition is made to Step S8, the control portion 1 determines whether or not there is any unselected paper feed portion 41. In a case where the control portion 1 determines that there is any unselected paper feed portion 41, a transition is made to Step S1. On the other hand, in a case where the control portion 1 determines that there is no unselected paper feed portion 41, this flow is ended.

Upon the transition from Step S8 to Step S1, the control portion 1 selects that one of the plurality of paper feed portions 41 which has not yet been subjected to updating of a corresponding piece of sheet delay information (said one of the paper feed portions 41 is used as a new selected paper feed portion 41). After that, the control portion 1 performs processes of Steps S2 to S7.

FIG. 5 shows a conceptual view of the sheet delay information. In FIG. 5, weight attribute-specific pieces of sheet delay information on the plurality of paper feed portions 41 are denoted by reference characters A11, A12, A13, A21, A22, A23, A31, A32, A33, A41, A42, and A43, respectively. Furthermore, in FIG. 5, the occurrence frequency of a sheet delay (the ratio of the number of delayed sheets to the number of sheets fed) is expressed in percentage.

Sheet delay information A11 corresponds to the first attribute of the paper feed portion 411, sheet delay information A12 corresponds to the second attribute of the paper feed portion 411, and sheet delay information A13 corresponds to the third attribute of the paper feed portion 411. Sheet delay information A21 corresponds to the first attribute of the paper feed portion 412, sheet delay information A22 corresponds to the second attribute of the paper feed portion 412, and sheet delay information A23 corresponds to the third attribute of the paper feed portion 412. Sheet delay information A31 corresponds to the first attribute of the paper feed portion 413, sheet delay information A32 corresponds to the second attribute of the paper feed portion 413, and sheet delay information A33 corresponds to the third attribute of the paper feed portion 413. Sheet delay information A41 corresponds to the first attribute of the paper feed portion 414, sheet delay information A42 corresponds to the second attribute of the paper feed portion 414, and sheet delay information A43 corresponds to the third attribute of the paper feed portion 414.

In an example shown in FIG. 5, weight attribute-specific values of the occurrence frequency of a sheet delay of the paper feed portion 411 are all 0% (no occurrence). Weight attribute-specific values of the occurrence frequency of a sheet delay of the paper feed portion 413 are also all 0% (no occurrence). Thus, either of the paper feed portions 411 and 413 is set as the paper feed source, so that the occurrence of a sheet delay is suppressed irrespective of a type of weight attribute of the sheet S.

Furthermore, as for the paper feed portion 412, a value of the occurrence frequency of a sheet delay corresponding to the first attribute is 5%, a value of the occurrence frequency of a sheet delay corresponding to the second attribute is 10%, and a value of the occurrence frequency of a sheet delay corresponding to the third attribute is 30%. For example, when deterioration has occurred in the rotor 410 of the paper feed portion 412 (the rotor 410 has become likely to slip relative to the sheet S), results shown in FIG. 5 are obtained. Accordingly, in a case where the paper feed portion 412 is set as the paper feed source, a sheet delay is more likely to occur compared with a case where either of the paper feed portions 411 and 413 is set as the paper feed source.

Furthermore, as for the paper feed portion 414, while a value of the occurrence frequency of a sheet delay corresponding to the first attribute is 0% (no occurrence), a value of the occurrence frequency of a sheet delay corresponding to the second attribute is 5%, and a value of the occurrence frequency of a sheet delay corresponding to the third attribute is 10%. Thus, while a sheet delay is unlikely to occur when a type of sheet S having the first attribute is housed in the paper feed portion 414, a sheet delay is likely to occur when a type of sheet S having either of the second attribute and the third attribute is housed in the paper feed portion 414.

Here, differential time information on each of the plurality of paper feed portions 41 is stored in the storage portion 2. The differential time information indicates a difference between the time required for arrival of the front end of the sheet S in the conveyance direction thereof (the time required for arrival) at the detection position DP of the status detection sensor 40 (the prescribed position in the sheet conveyance path 10) from the start of feeding of the sheet S by any of the paper feed portions 41 and a theoretical time.

As one type of information updating process, the control portion 1 performs, in addition to the process of updating the sheet delay information, a process of updating the differential time information. That is, upon determining that the updating condition is met, the control portion 1 also performs updating of the differential time information.

Figure 6:
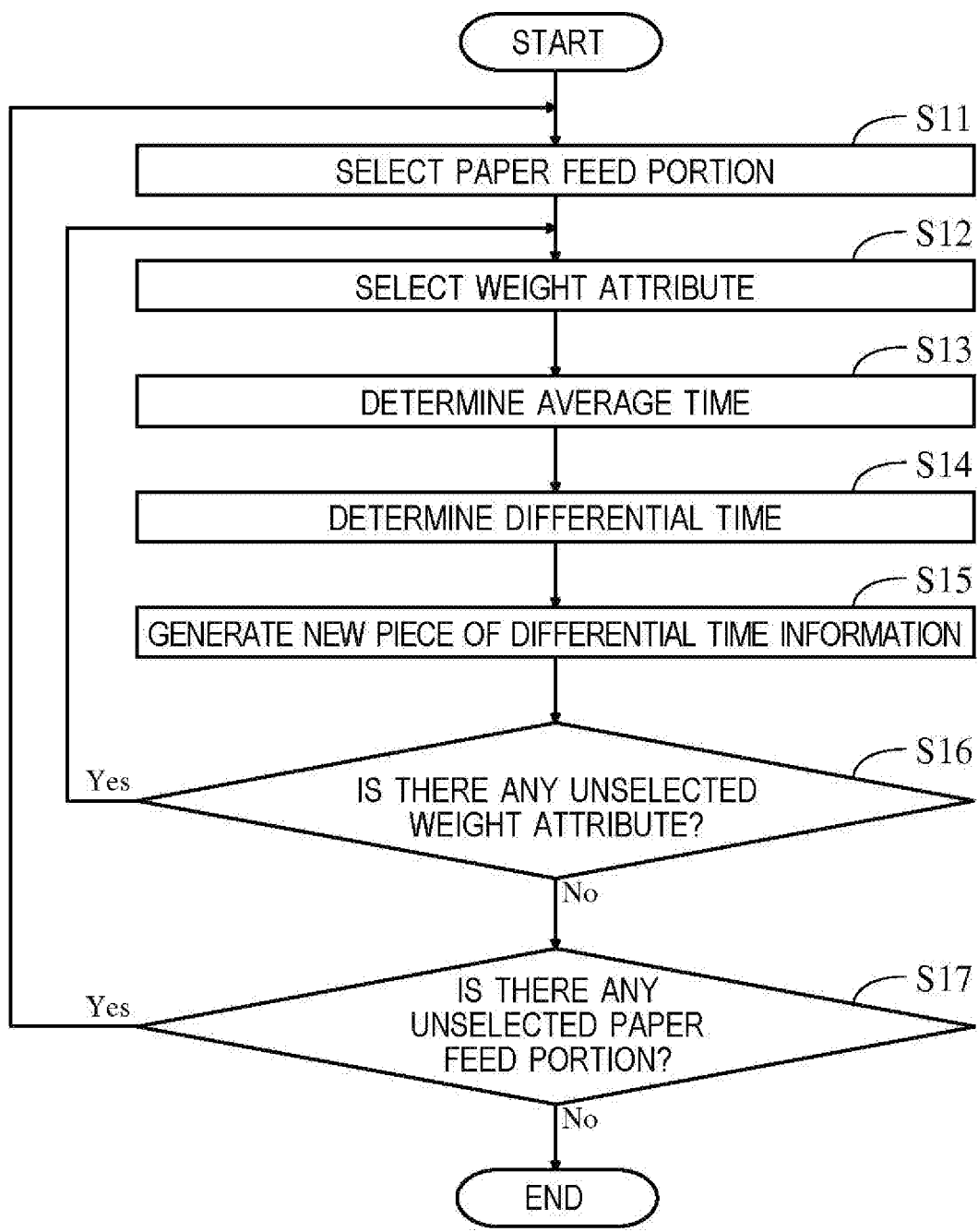
FIG. 6 is a flow chart showing a flow of an information updating process (a process of updating differential time information) performed by the control portion of the image forming apparatus according to the one embodiment of the present disclosure.

With reference to a flow chart shown in FIG. 6, the following describes a flow of the information updating process (the process of updating the differential time information) performed by the control portion 1. The flow shown in FIG. 6 starts when the control portion 1 determines that the updating condition is met.

At Step S11, the control portion 1 selects one of the plurality of paper feed portions 41 (the paper feed portions 411 to 414). In the following description, one of the paper feed portions 41 selected by the control portion 1 in a process of Step S11 is referred to as a selected paper feed portion 41.

At Step S12, the control portion 1 selects one of the plural types of weight attributes (the first to third attributes). In the following description, the type of weight attribute selected by the control portion 1 in a process of Step S12 is referred to as a selected weight attribute.

At Step S13, the control portion 1 extracts values of the time required for arrival measured within the prescribed latest period of time (for example, one month), which are associated with an identifier of the selected paper feed portion 41 and associated with the selected weight attribute, and determines an average time, i.e., an average of the thus extracted values of the time required for arrival. Then, at Step S14, the control portion 1 determines, as a differential time, a time obtained by subtracting the theoretical time from the average time.

At Step S15, the control portion 1 newly generates, as a piece of differential time information corresponding to the selected paper feed portion 41 and corresponding to the selected weight attribute, a piece of information indicating the differential time determined in a process of Step S14. Furthermore, the control portion 1 controls the storage portion 2 to store the new piece of differential time information thus generated. At this time, the control portion 1 deletes, from the storage portion 2, any existing piece of differential time information corresponding to the selected paper feed portion 41 and corresponding to the selected weight attribute. That is, the control portion 1 rewrites any existing piece of differential time information stored in the storage portion 2 into a new piece of differential time information.

At a point in time of the delivery of the image forming apparatus 100, the differential time indicated by differential time information on each of the plurality of paper feed portions 41 is set to zero.

At Step S16, the control portion 1 determines whether or not there is any unupdated piece of differential time information among weight attribute-specific pieces of differential time information on the selected paper feed portion 41. In other words, the control portion 1 determines whether or not there is any unselected weight attribute. In a case where the control portion 1 determines that there is any unselected weight attribute (there remains any unupdated piece of differential time information among the weight attribute-specific pieces of differential time information on the selected paper feed portion 41), a transition is made to Step S12. On the other hand, in a case where the control portion 1 determines that there is no unselected weight attribute (all of the weight attribute-specific pieces of differential time information on the selected paper feed portion 41 have been updated), a transition is made to Step S17.

Upon the transition from Step S16 to Step S12, the control portion 1 extracts one unupdated piece of differential time information among the weight attribute-specific pieces of differential time information on the selected paper feed portion 41 and selects a type of weight attribute corresponding to the extracted piece of differential time information (said type of weight attribute is used as a new selected weight attribute). After that, the control portion 1 performs processes of Steps S13 to S15.

In a case where the transition is made to Step S17, the control portion 1 determines whether or not there is any unselected paper feed portion 41. In a case where the control portion 1 determines that there is any unselected paper feed portion 41, a transition is made to Step S11. On the other hand, in a case where the control portion 1 determines that there is no unselected paper feed portion 41, this flow is ended.

Upon the transition from Step S17 to Step S11, the control portion 1 selects that one of the plurality of paper feed portions 41 which has not yet been subjected to updating of a corresponding piece of differential time information (said one of the paper feed portions 41 is used as a new selected paper feed portion 41). After that, the control portion 1 performs processes of Steps S12 to S16.

FIG. 7 shows a conceptual view of the differential time information. In FIG. 7, weight attribute-specific pieces of differential time information on the plurality of paper feed portions 41 are denoted by reference characters B11, B12, B13, B21, B22, B23, B31, B32, B33, B41, B42, and B43, respectively. In FIG. 7, for the sake of convenience, values of the time required for arrival (the average time) are listed. Furthermore, values of the theoretical time (for example, the theoretical time is 1,000 ms) are also listed.

Differential time information B11 corresponds to the first attribute of the paper feed portion 411, differential time information B12 corresponds to the second attribute of the paper feed portion 411, and differential time information B13 corresponds to the third attribute of the paper feed portion 411. Differential time information B21 corresponds to the first attribute of the paper feed portion 412, differential time information B22 corresponds to the second attribute of the paper feed portion 412, and differential time information B23 corresponds to the third attribute of the paper feed portion 412. Differential time information B31 corresponds to the first attribute of the paper feed portion 413, differential time information B32 corresponds to the second attribute of the paper feed portion 413, and differential time information B33 corresponds to the third attribute of the paper feed portion 413. Differential time information B41 corresponds to the first attribute of the paper feed portion 414, differential time information B42 corresponds to the second attribute of the paper feed portion 414, and differential time information B43 corresponds to the third attribute of the paper feed portion 414.

<Paper Feed Source Setting Process>

Figure 8:
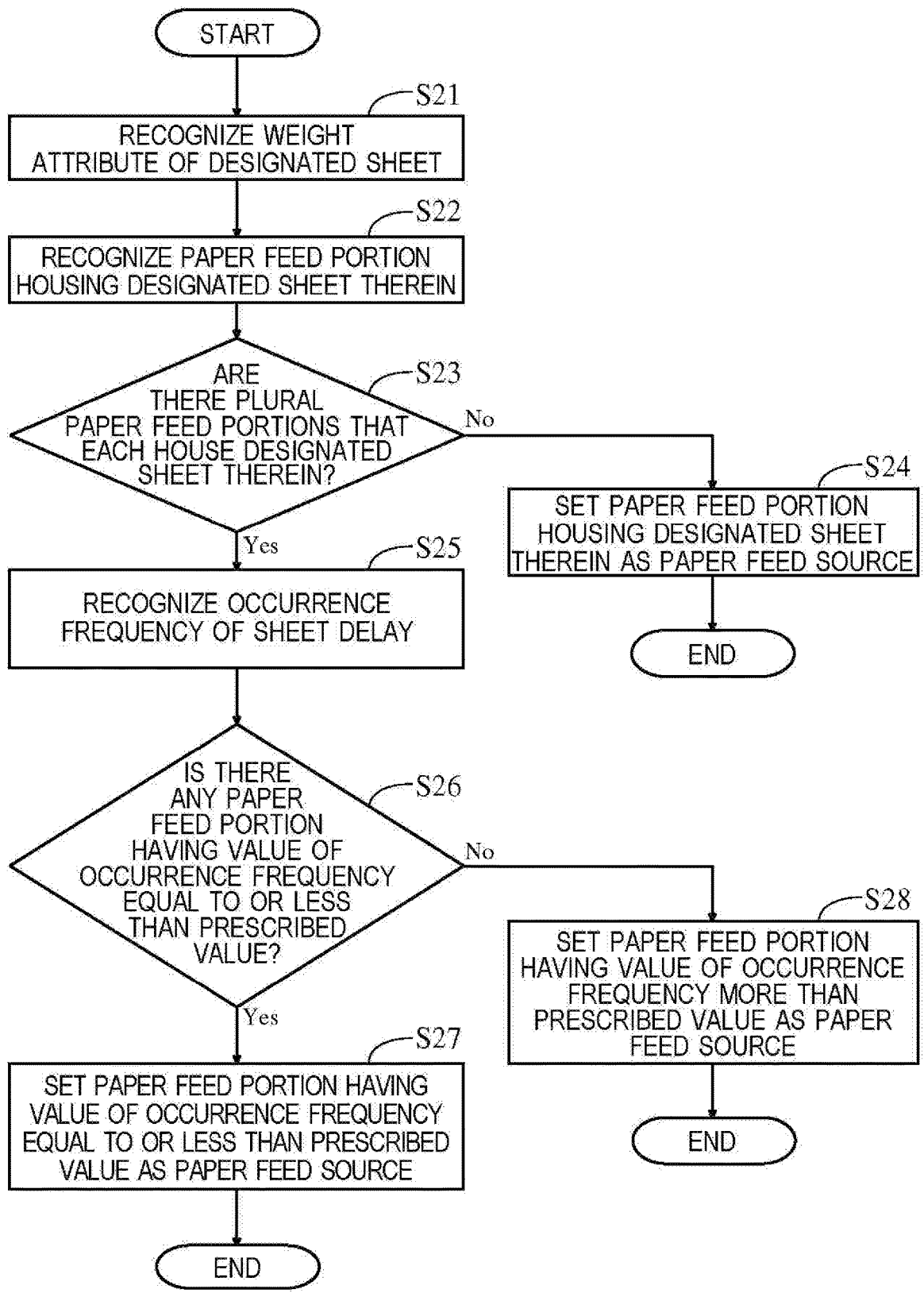
FIG. 8 is a flow chart showing a flow of a paper feed source setting process performed by the control portion of the image forming apparatus according to the one embodiment of the present disclosure.

With reference to a flow chart shown in FIG. 8, the following describes a flow of the paper feed source setting process performed by the control portion 1. The flow shown in FIG. 8 starts when the control portion 1 determines that a request for executing a printing job has been accepted.

At Step S21, the control portion 1 recognizes a type of weight attribute of a designated sheet S designated by a user as a type of sheet S used in the printing job. Furthermore, at Step S22, the control portion 1 recognizes that one of the plurality of paper feed portions 41 which houses the designated sheet S therein.

Figure 9:
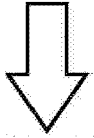
FIG. 9 is a view for explaining the paper feed source setting process performed by the control portion of the image forming apparatus according to the one embodiment of the present disclosure.

Here, for example, it is assumed that the type of weight attribute of the designated sheet S is the second attribute. As shown in FIG. 9, it is further assumed that a type of sheet S having the second attribute is housed in each of the paper feed portions 411 and 412. It is also assumed that a type of sheet S having any other type of weight attribute is housed in each of the paper feed portions 413 and 414. In this example, each of the paper feed portions 411 and 412 is recognized as that one of the paper feed portions 41 which houses the designated sheet S therein.

At Step S23, the control portion 1 determines whether or not there are plural paper feed portions 41 that each house the designated sheet S therein. In a case where the control portion 1 determines that there is only one paper feed portion 41 that houses the designated sheet S therein, a transition is made to Step S24. Upon the transition to Step S24, the control portion 1 sets, as the paper feed source, the one paper feed portion 41 that houses the designated sheet S therein.

In a case where, at Step S23, the control portion 1 determines that there are plural paper feed portions 41 that each house the designated sheet S therein, a transition is made to Step S25. Upon the transition to Step S25, based on the sheet delay information on each of the paper feed portions 41 stored in the storage portion 2, the control portion 1 recognizes the occurrence frequency of a sheet delay of each of the plural paper feed portions 41 that each house the designated sheet S therein. At this time, the control portion 1 recognizes the occurrence frequency of a sheet delay indicated by a piece of sheet delay information corresponding to the same type of weight attribute as that of the designated sheet S. In an example shown in FIG. 9, the occurrence frequency of a sheet delay of the paper feed portion 411 is recognized as 0% (no occurrence), and the occurrence frequency of a sheet delay of the paper feed portion 412 is recognized as 10%.

At Step S26, for each of the plural paper feed portions 41 that each house the designated sheet S therein, the control portion 1 checks whether or not the occurrence frequency of a sheet delay recognized in a process of Step S25 has a value equal to or less than a prescribed value. Furthermore, based on a result of said checking, the control portion 1 determines whether or not there is any paper feed portion 41 whose value of the occurrence frequency of a sheet delay is equal to or less than the prescribed value. In a case where the control portion 1 determines that there is any paper feed portion 41 whose value of the occurrence frequency of a sheet delay is equal to or less than the prescribed value, a transition is made to Step S27.

Upon the transition to Step S27, the control portion 1 sets, as the paper feed source, one of the paper feed portions 41 whose value of the occurrence frequency of a sheet delay is equal to or less than the prescribed value. For example, the prescribed value is "zero." That is, one of the paper feed portions 41 whose value of the occurrence frequency of a sheet delay indicated by a most recently generated piece of sheet delay information is 0% (a paper feed portion 41 in which no sheet delay is occurring) is preferentially set as the paper feed source.

The prescribed value can be arbitrarily changed by a user. Such a change to the prescribed value is accepted by the operation panel 5 from the user.

For example, in an example shown in FIG. 9, a value of the occurrence frequency of a sheet delay of the paper feed portion 411 corresponding to the second attribute (a type of weight attribute of the designated sheet S) is 0%, and a value of the occurrence frequency of a sheet delay of the paper feed portion 412 corresponding to the second attribute (the type of weight attribute of the designated sheet S) is 10%. Accordingly, the paper feed portion 411 is set as the paper feed source.

In a case where the plural paper feed portions 41 that each house the designated sheet S therein all have a value of 0% of the occurrence frequency of a sheet delay, for example, among said plural paper feed portions 41, such a paper feed portion 41 that a corresponding one of the cassettes CA is mounted at an uppermost position may be set as the paper feed source.

In a case where, at Step S26, the control portion 1 determines that there is no paper feed portion 41 whose value of the occurrence frequency of a sheet delay is equal to or less than the prescribed value, a transition is made to Step S28. That is, in a case where the control portion 1 determines that the plural paper feed portions 41 that each house the designated sheet S therein all have a value of the occurrence frequency of a sheet delay more than the prescribed value, a transition is made to Step S28.

Upon the transition to Step S28, the control portion 1 sets, as the paper feed source, one of the paper feed portions 41 whose value of the occurrence frequency of a sheet delay is more than the prescribed value. For example, among the plural paper feed portions 41 that each house the designated sheet S therein (paper feed portions 41 whose values of the occurrence frequency of a sheet delay are more than the prescribed value), a paper feed portion 41 having a lowest value of the occurrence frequency of a sheet delay may be set as the paper feed source. Furthermore, among the plural paper feed portions 41 that each house the designated sheet S therein (the paper feed portions 41 whose values of the occurrence frequency of a sheet delay are more than the prescribed value), such a paper feed portion 41 that a corresponding one of the cassettes CA is mounted at an uppermost position may be set as the paper feed source.

As a modification example, a type of sheet S having a different type of weight attribute from that of the designated sheet S may be used in a printing job.

For example, it is assumed that while there is a paper feed portion 41 that houses the designated sheet S therein, said paper feed portion 41 has a value of the occurrence frequency of a sheet delay more than the prescribed value. Alternatively, it is assumed that there is no paper feed portion 41 that houses the designated sheet S therein.

In such a case, in a configuration of the modification example, when there is a paper feed portion 41 whose value of the occurrence frequency of a sheet delay is equal to or less than the prescribed value, even if a type of weight attribute of a type of sheet S housed in said paper feed portion 41 is different from that of the designated sheet S, the control portion 1 preferentially sets said paper feed portion 41 as the paper feed source. Alternatively, a configuration may be adopted in which the operation panel 5 accepts an input as to whether or not to permit the use of said paper feed portion 41, and said paper feed portion 41 is set as the paper feed source only when an input for permitting the use thereof has been accepted.

<Timing Setting Process>

For example, upon the start of feeding of the sheet S by one of the paper feed portions 41 set as the paper feed source, the control portion 1 starts measuring the time. Then, based on a time that has elapsed since the start of feeding of the sheet S by the one of the paper feed portions 41 set as the paper feed source, the control portion 1 performs control so as to achieve right timing to start writing of an electrostatic latent image.

Here, standard timing is previously set and stored in the storage portion 2. The standard timing is timing to start writing of an ideal electrostatic latent image in a case where no sheet delay is occurring. In the case where no sheet delay is occurring, writing of an electrostatic latent image is started at the standard timing, and thus a toner image on the photosensitive drum 431, which is obtained by developing the electrostatic latent image, can be transferred on the sheet S without any misalignment.

In a case, however, where a sheet delay is occurring, when writing of an electrostatic latent image is started at the standard timing, there may occur a trouble that even though the sheet S has not yet arrived at a transfer nip, a toner image on the photosensitive drum 431 arrives at the transfer nip. In this case, at the time of cleaning the circumferential surface of the photosensitive drum 431, the toner image on the photosensitive drum 431 is removed and discarded. This results in a waste of toner (a toner consumption amount is increased).

As a solution to this, after setting the paper feed source, the control portion 1 performs a timing adjustment process of, based on the occurrence frequency of a sheet delay of one of the paper feed portions 41 set as the paper feed source, adjusting timing to start writing of an electrostatic latent image. The control portion 1 adjusts the timing to start writing and then controls the printing portion 4 to perform printing.

Figure 10:
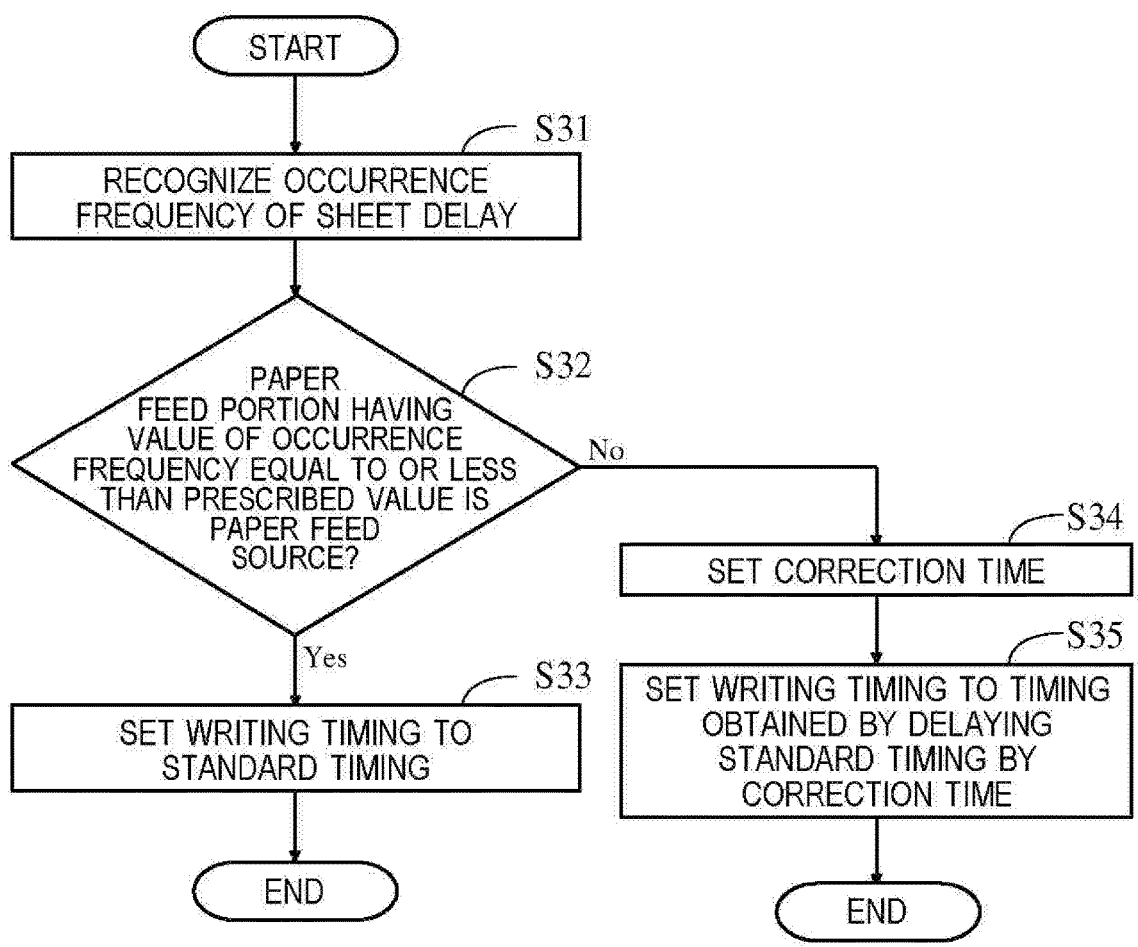
FIG. 10 is a flow chart showing a flow of a timing adjustment process performed by the control portion of the image forming apparatus according to the one embodiment of the present disclosure.

With reference to a flow chart shown in FIG. 10, the following describes a flow of the timing adjustment process performed by the control portion 1. The flow shown in FIG. 10 starts when the paper feed source is set by the control portion 1.

At Step S31, the control portion 10 recognizes the occurrence frequency of a sheet delay of one of the paper feed portions 41 set as the paper feed source. Then, at Step S32, the control portion 31 determines whether or not one of the paper feed portions 41 whose value of the occurrence frequency of a sheet delay is equal to or less than the prescribed value has been set as the paper feed source.

In a case where, at Step S32, the control portion 1 determines that one of the paper feed portions 41 whose value of the occurrence frequency of a sheet delay is equal to or less than the prescribed value has been set as the paper feed source, a transition is made to Step S33. Upon the transition to Step S33, the control portion 1 sets the timing to start writing of an electrostatic latent image to the standard timing.

In a case where, at Step S32, the control portion 1 determines that one of the paper feed portions 41 whose value of the occurrence frequency of a sheet delay is more than the prescribed value is set as the paper feed source, a transition is made to Step S34. Upon the transition to Step S34, the control portion 1 sets a correction time. Then, at Step S35, the control portion 1 sets the timing to start writing of an electrostatic latent image to timing obtained by delaying the standard timing by the correction time.

Here, a description is given of a method for setting the correction time. The control portion 1 recognizes a differential time (here, referred to as an object differential time for the sake of convenience) indicated by a piece of differential time information corresponding to one of the paper feed portions 41 set as the paper feed source. Then, the control portion 1 sets, as the correction time, a value of time equal to or more than the object differential time. For example, the control portion 1 sets, as the correction time, a value of time obtained by adding a preset correction margin time to the object differential time. The method for setting the correction time is not particularly limited. Any method can be adopted as long as a value of time equal to or more than the object differential time is set as the correction time.

As described above, the image forming apparatus 100 of this embodiment includes the plurality of paper feed portions 41 that each include the cassette CA housing the sheet S therein and feed the sheet S housed in the cassette CA to the sheet conveyance path 10, the image forming portion 43 that prints an image on the sheet S fed to the sheet conveyance path 10, the storage portion 2 that stores, for each of the plurality of paper feed portions 41, sheet delay information indicating an occurrence frequency of a sheet delay that is a phenomenon in which a time required for arrival of the front end of the sheet S at the detection position DP (the prescribed position) in the sheet conveyance path 10 from the start of feeding of the sheet S is larger than a preset threshold time, and the control portion 1 that, based on the sheet delay information on the each of the plurality of paper feed portions 41 stored in the storage portion 2, recognizes the occurrence frequency of the sheet delay of the each of the plurality of paper feed portions 41, preferentially sets, as a paper feed source, one of the plurality of paper feed portions 41 whose value of the occurrence frequency of the sheet delay is equal to or less than a prescribed value, and controls the one of the plurality of paper feed portions 41 set as the paper feed source to feed the sheet S to the sheet conveyance path 10.

In a configuration of this embodiment, one of the paper feed portions 41 whose value of the occurrence frequency of a sheet delay is equal to or less than the prescribed value is preferentially set as the paper feed source. That is, when there is a paper feed portion 41 whose value of the occurrence frequency of a sheet delay is 0%, said paper feed portion 41 is set as the paper feed source. Here, the occurrence frequency of a sheet delay of one of the paper feed portions 41 having a value of 0% means that substantially no deterioration has occurred in the rotor 410 of the one of the paper feed portions 41 (there is substantially no possibility that the rotor 410 slips relative to the sheet S). That is, when one of the paper feed portions 41 whose value of the occurrence frequency of a sheet delay is 0% is set as the paper feed source, it is possible to suppress the occurrence of a sheet delay. As a result, it is possible to suppress a decrease in productivity caused by the occurrence of a sheet delay.

In a case where one of the paper feed portions 41 whose value of the occurrence frequency of a sheet delay is 0% is set as the paper feed source, there is suppressed the occurrence of the trouble that even though the sheet S has not yet arrived at a transfer nip, a toner image on the photosensitive drum 431 arrives at the transfer nip. Accordingly, it is possible to suppress useless toner consumption.

Furthermore, in this embodiment, as described above, upon determining that the preset updating condition (the prescribed condition) is met, the control portion 1 newly generates a piece of sheet delay information on each of the paper feed portions 41 and rewrites any existing piece of sheet delay information stored in the storage portion 2 into a new piece of sheet delay information. Here, deterioration occurs with time in the rotor 410 of each of the paper feed portions 41. Because of this, without the sheet delay information being updated, there might occur a trouble that while the occurrence frequency of a sheet delay indicated by the sheet delay information is relatively low, a sheet delay has actually frequently been occurring. In this case, one of the paper feed portions 41 whose value of an actual occurrence frequency of a sheet delay is high may be set as the paper feed source. Accordingly, it is preferable that the sheet delay information be updated.

Furthermore, in this embodiment, as described above, every time any of the paper feed portions 41 feeds one sheet S, the control portion 1 measures a value of the time required for arrival and controls the storage portion 2 to store, for each of the paper feed portions 41, the thus measured value of the time required for arrival. Further, upon determining that the updating condition is met, for each of the plurality of paper feed portions 41, the control portion 1 recognizes the number of sheets S fed within a prescribed latest period of time, recognizes the number of delayed sheets that is the number of sheets S each having a value of the time required for arrival larger than the preset threshold time among the sheets S fed within the prescribed latest period of time, determines, as the occurrence frequency of a sheet delay, a ratio of the number of delayed sheets to the number of sheets fed, and generates information indicating the ratio as a new piece of sheet delay information. That is, in this embodiment, a value of the time required for arrival of the front end of the sheet S at the detection position DP from the start of feeding of the sheet S is actually measured, and based on the thus actually measured value of the time, the sheet delay information is generated (the occurrence frequency of a sheet delay is determined). Thus, highly accurate sheet delay information can be obtained.

Here, in a case where one of the paper feed portions 41 whose value of the occurrence frequency of a sheet delay is more than the prescribed value is set as the paper feed source, a sheet delay is more likely to occur than in a case where one of the paper feed portions 41 whose value of the occurrence frequency of a sheet delay is equal to or less than the prescribed value is set as the paper feed source.

As a solution to this, in this embodiment, as described above, in the case where one of the paper feed portions 41 whose value of the occurrence frequency of a sheet delay is more than the prescribed value is set as the paper feed source, the control portion 1 performs control so that timing to start writing of an electrostatic latent image is delayed from the standard timing. This suppresses the occurrence of the trouble that even though the sheet S has not yet arrived at a transfer nip, a toner image on the photosensitive drum 431 arrives at the transfer nip. That is, it is possible to suppress useless toner consumption.

Furthermore, in this embodiment, as described above, upon determining that the updating condition is met, for each of the plurality of paper feed portions 41, the control portion 1 determines a differential time obtained by subtracting a theoretical time from an average time, i.e., an average of values of the time required for arrival measured within a prescribed latest period of time, and controls the storage portion 2 to store, for each of the paper feed portions 41, differential time information indicating the differential time. Then, in the case where one of the paper feed portions 41 whose value of the occurrence frequency of a sheet delay is more than the prescribed value is set as the paper feed source, the control portion 1 sets, as a correction time, a value of time equal to or more than a value of the differential time indicated by a piece of differential time information corresponding the one of the paper feed portions 41 set as the paper feed source. Thus, the correction time can be easily set to an appropriate time.

Furthermore, in this embodiment, as described above, the storage portion 2 stores the sheet delay information on each of the plurality of paper feed portions 41 with respect to each type of weight attribute. Further, when newly setting the paper feed source, the control portion 1 recognizes a type of weight attribute of the designated sheet S designated by a user as a type of sheet S to be used for printing. The control portion 1 preferentially sets, as the paper feed source, among those ones of the paper feed portions 41 which each house the designated sheet S therein, a paper feed portion 41 whose value of the occurrence frequency of a sheet delay corresponding to the same type of weight attribute as that of the designated sheet S is equal to or less than the prescribed value. Thus, even when there are plural types of weight attributes of each type of sheet S usable in a printing job (each type of sheet S feedable to the sheet conveyance path 10), it is possible to suppress the occurrence of a sheet delay.

Furthermore, in this embodiment, as described above, the plurality of status detection sensors 40 (the sensors) assigned respectively to the plurality of paper feed portions 41 are installed in the image forming apparatus 100. Each of the plurality of status detection sensors 40 has an output value that changes depending on the presence or absence of the sheet S at a position at a prescribed distance from the paper feed position FB of a corresponding one of the paper feed portions 41 along the conveyance route of the sheet S. The control portion 1 measures, as the time required for arrival, a time taken from the start of feeding of the sheet S to a time when a corresponding one of the status detection sensors 40 outputs a value indicating the presence of the sheet S. Thus, the time required for arrival can be easily measured.

The embodiment disclosed herein is to be construed in all respects as illustrative and not limiting. The scope of the present disclosure is indicated by the appended claims rather than by the foregoing description of the embodiment, and all changes that come within the meaning and range of equivalency of the claims are intended to be embraced therein.

What is claimed is:

1. An image forming apparatus, comprising:
a plurality of paper feed portions that each include a cassette housing a sheet therein and feed the sheet housed in the cassette to a sheet conveyance path;
an image forming portion that prints an image on the sheet fed to the sheet conveyance path;
a storage portion that stores, for each of the plurality of paper feed portions, sheet delay information indicating an occurrence frequency of a sheet delay that is a phenomenon in which a time required for arrival of a front end of the sheet at a prescribed position in the sheet conveyance path from a start of feeding of the sheet is larger than a threshold time; and
a control portion that, based on the sheet delay information on the each of the plurality of paper feed portions stored in the storage portion, recognizes the occurrence frequency of the sheet delay of the each of the plurality of paper feed portions, preferentially sets, as a paper feed source, one of the plurality of paper feed portions whose value of the occurrence frequency of the sheet delay is equal to or less than a prescribed value, and controls the one of the plurality of paper feed portions set as the paper feed source to feed the sheet to the sheet conveyance path;
wherein
upon determining that a prescribed condition is met, the control portion newly generates a piece of the sheet delay information on each of the plurality of paper feed portions and rewrites any existing piece of the sheet delay information stored in the storage portion into a new piece of the sheet delay information;
every time any of the plurality of paper feed portions feeds one sheet, the control portion measures a value of the time required for arrival and controls the storage portion to store, for each of the plurality of paper feed portions, the thus measured value of the time required for arrival, and
upon determining that the prescribed condition is met, for each of the plurality of paper feed portions, the control portion recognizes a number of sheets fed within a prescribed latest period of time, recognizes a number of delayed sheets that is a number of sheets each having a value of the time required for arrival larger than the threshold time among the sheets fed within the prescribed latest period of time, determines, as the occurrence frequency of the sheet delay, a ratio of the number of delayed sheets to the number of sheets fed, and generates information indicating the ratio as a new piece of the sheet delay information.

2. The image forming apparatus according to claim 1, wherein
there are plural types of weight attributes of each type of sheet feedable to the sheet conveyance path,
the storage portion stores the sheet delay information on each of the plurality of paper feed portions with respect to each of the plural types of weight attributes, and
when newly setting the paper feed source, the control portion recognizes a type of weight attribute of a designated sheet designated by a user as a type of sheet to be used for printing, and preferentially sets, as the paper feed source, among those ones of the plurality of paper feed portions which each house the designated sheet therein, a paper feed portion whose value of the occurrence frequency of the sheet delay corresponding to a same type of weight attribute as the type of weight attribute of the designated sheet is equal to or less than the prescribed value.

3. The image forming apparatus according to claim 1, further comprising:
a plurality of sensors that are assigned to the plurality of paper feed portions, respectively,
each of the plurality of sensors has an output value that changes depending on presence or absence of the sheet at a position at a prescribed distance from a paper feed position of a corresponding one of the plurality of paper feed portions along a conveyance route of the sheet, and
the control portion measures, as the time required for arrival, a time taken from a start of feeding of the sheet to a time when a corresponding one of the plurality of sensors outputs a value indicating the presence of the sheet.

4. An image forming apparatus, comprising:
a plurality of paper feed portions that each include a cassette housing a sheet therein and feed the sheet housed in the cassette to a sheet conveyance path;
an image forming portion that prints an image on the sheet fed to the sheet conveyance path;

a storage portion that stores, for each of the plurality of paper feed portions, sheet delay information indicating an occurrence frequency of a sheet delay that is a phenomenon in which a time required for arrival of a front end of the sheet at a prescribed position in the sheet conveyance path from a start of feeding of the sheet is larger than a threshold time; and a control portion that, based on the sheet delay information on the each of the plurality of paper feed portions stored in the storage portion, recognizes the occurrence frequency of the sheet delay of the each of the plurality of paper feed portions, preferentially sets, as a paper feed source, one of the plurality of paper feed portions whose value of the occurrence frequency of the sheet delay is equal to or less than a prescribed value, and controls the one of the plurality of paper feed portions set as the paper feed source to feed the sheet to the sheet conveyance path;

wherein the image forming portion forms an electrostatic latent image and prints, on the sheet fed to the sheet conveyance path, a toner image obtained by developing the electrostatic latent image, in a case where one of the plurality of paper feed portions whose value of the occurrence frequency of the sheet delay is equal to or less than the prescribed value is set as the paper feed source, the control portion sets timing to start writing of the electrostatic latent image to preset standard timing, and in a case where one of the plurality of paper feed portions whose value of the occurrence frequency of the sheet delay is more than the prescribed value is set as the paper feed source, the control portion sets a correction time and sets the timing to start writing to timing obtained by delaying the standard timing by the correction time.

5. The image forming apparatus according to claim 4, wherein every time any of the plurality of paper feed portions feeds one sheet, the control portion measures a value of the time required for arrival and controls the storage portion to store, for each of the plurality of paper feed portions, the thus measured value of the time required for arrival, upon determining that a prescribed condition is met, for each of the plurality of paper feed portions, the control portion determines a differential time obtained by subtracting a theoretical time required for arrival of the front end of the sheet at the prescribed position from the start of feeding of the sheet from an average time that is an average of values of the time required for arrival measured within a prescribed latest period of time, and controls the storage portion to store, for each of the plurality of paper feed portions, differential time information indicating the differential time, and in a case where one of the plurality of paper feed portions whose value of the occurrence frequency of the sheet delay is more than the prescribed value is set as the paper feed source, the control portion sets, as the correction time, a value of time equal to or more than a value of the differential time indicated by a piece of the differential time information corresponding the one of the plurality of paper feed portions set as the paper feed source.

6. The image forming apparatus according to claim 4, wherein there are plural types of weight attributes of each type of sheet feedable to the sheet conveyance path, the storage portion stores the sheet delay information on each of the plurality of paper feed portions with respect to each of the plural types of weight attributes, and when newly setting the paper feed source, the control portion recognizes a type of weight attribute of a designated sheet designated by a user as a type of sheet to be used for printing, and preferentially sets, as the paper feed source, among those ones of the plurality of paper feed portions which each house the designated sheet therein, a paper feed portion whose value of the occurrence frequency of the sheet delay corresponding to a same type of weight attribute as the type of weight attribute of the designated sheet is equal to or less than the prescribed value.

7. The image forming apparatus according to claim 4, further comprising:

a plurality of sensors that are assigned to the plurality of paper feed portions, respectively, each of the plurality of sensors has an output value that changes depending on presence or absence of the sheet at a position at a prescribed distance from a paper feed position of a corresponding one of the plurality of paper feed portions along a conveyance route of the sheet, and the control portion measures, as the time required for arrival, a time taken from a start of feeding of the sheet to a time when a corresponding one of the plurality of sensors outputs a value indicating the presence of the sheet.

* * * * *